(12) United States Patent
Kim et al.

(10) Patent No.: US 10,326,268 B2
(45) Date of Patent: Jun. 18, 2019

(54) CIRCUIT RELIABILITY IMPROVEMENT BY DETECTING AND MITIGATING HIGH VOLTAGE TRANSIENT EVENT AT SUPPLY

(71) Applicant: TEXAS INSTRUMENTS INCORPORATED, Dallas, TX (US)

(72) Inventors: Eung J. Kim, Allen, TX (US); Md. Abidur Rahman, Richardson, TX (US); Sualp Aras, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 353 days.

(21) Appl. No.: 15/225,478

(22) Filed: Aug. 1, 2016

(65) Prior Publication Data

US 2017/0033551 A1 Feb. 2, 2017

Related U.S. Application Data

(60) Provisional application No. 62/199,705, filed on Jul. 31, 2015.

(51) Int. Cl.
*H02H 3/00* (2006.01)
*H02H 3/20* (2006.01)
*H02H 3/02* (2006.01)

(52) U.S. Cl.
CPC .............. *H02H 3/20* (2013.01); *H02H 3/021* (2013.01)

(58) Field of Classification Search
None
See application file for complete search history.

(56) References Cited

U.S. PATENT DOCUMENTS 6,489,748 B1 * 12/2002 Okamura ............... H04Q 1/032
320/116
8,539,263 B2 * 9/2013 Gussoni ............. G06K 19/0701
713/300

* cited by examiner

*Primary Examiner* — Stephen W Jackson
(74) *Attorney, Agent, or Firm* — Lawrence J. Bassuk; Charles A. Brill; Frank D. Cimino (57) ABSTRACT

A circuit reliability system with a first voltage supply for outputting a first voltage and a second voltage supply for outputting a second voltage. The system also includes: (i) at least one node for providing a potential in response to the first voltage and the second voltage; (ii) monitoring circuitry for detecting the first voltage exceeding a threshold; and (iii) disabling circuitry, for disabling the second voltage supply in response to the monitoring circuitry detecting the first voltage exceeding a threshold.

16 Claims, 6 Drawing Sheets

CIRCUIT RELIABILITY IMPROVEMENT BY DETECTING AND MITIGATING HIGH VOLTAGE TRANSIENT EVENT AT SUPPLY

CROSS-REFERENCES TO RELATED APPLICATIONS

This application claims priority to, the benefit of the filing date of, and hereby incorporates herein by reference, U.S. Provisional Patent Application 62/199,705, entitled "Mitigation of Device Reliability Concern By Detecting High Voltage Transient Event At Supply," filed Jul. 31, 2015.

STATEMENT REGARDING FEDERALLY SPONSORED RESEARCH OR DEVELOPMENT

Not Applicable.

BACKGROUND OF THE INVENTION

The preferred embodiments relate to electrical systems and methods and, more particularly, to improving circuit reliability by detecting and mitigating high voltage transient events at the circuit voltage supply.

During fast transient conduction in a passenger vehicle fitted with a 12V or 24V electric system, supply lines could have a spiking transient emission because of the inductance on electric wires. This voltage spikes could go up to 55V on top of the supply voltage. Therefore, the supply voltage total can spike up to 13V (typical supply voltage)+55V (peak of supply transient)=68V. Vehicle modules or systems also may include a charge pump, which as known in the art adds voltage to the nominal system supply voltage by switching voltage among one or more internal capacitors and to a final capacitance stage that can store a voltage greater than the input. In the event of a spike as described with a resultant voltage of 68V, therefore, then the output of the charge pump adds to the 68V spiked supply. For example, assume that the charge pump adds an additional 13V to the supply voltage; hence, when the supply spikes to 68V, then the additional 13V from the charge pump can bring the total potential to 81V (i.e., 68+13=81V). Thus, the output of the charge pump to ground can have the largest voltage difference in the system.

Excessive voltages from the combination of transients and a charge pump pose risk to other circuit structures and elements. For example, the charge pump output voltage may be used to drive the gate of an external switch device (e.g., MOSFET). Thus, the charge pump output voltage cannot be increased all the way up to the Vgs (i.e., gate-to-source voltage) limit of the switch, the device breakdown voltage, so as to not exceed the device breakdown voltage. A potential compromise, therefore, is to limit the charge pump output voltage to reduce the chance of breakdown, but such a limitation would likewise limit the turn-on resistance of the switch, too. As another example, internal PN-junctions must tolerate the charge pump output node potential, without breaking down. For example, any device connected to the high voltage node, such as the charge-pump output, will have a PN junction. For a fully isolated pMOS device, an isolation tank will be n-type doping area, which is connected to the highest voltage potential, and this will have a PN-junction to substrate. To make devices tolerable for such a high voltage, isolation tanks may be implemented. An increase in the protection of such devices, however, requires a corresponding increase in size and spacing, and, as a result, overall chip area would be significantly, and undesirably, increased.

Often device standards or specifications also must be satisfied in a system that will experience excessive voltages from the combination of transients and a charge pump. For example, the International Organization for Standardization (ISO) is a worldwide federation of national standards bodies (ISO member bodies), and in its ISO 7637-2, it specifies test methods and procedures to ensure the compatibility to conducted electrical transients of equipment installed on passenger cars and commercial vehicles fitted with 12V or 24V electrical systems. The possible maximum voltage peak during supply disturbance, as specified by ISO 7637-2:2011 5.6.2, and with the values given above would be 68V+ 13V=81V. One approach in this context, therefore, would be to select devices capable of withstanding the 81V peaks. In some manufacturing processes, however, such devices have isolated PN-junction ratings below or barely at these levels, so such options may be limited or even the most robust of the devices may still have questionable chances of surviving the peak voltages at, or slightly exceeding, its limit.

Given the preceding discussion, certain applications will have requirements that are not sufficiently addressed by the prior art. Thus, the present inventors seek to improve upon the prior art and address the considerations of such applications, as further detailed below.

BRIEF SUMMARY OF THE INVENTION

In a preferred embodiment, there is a circuit reliability system. The system comprises a first voltage supply for outputting a first voltage and a second voltage supply for outputting a second voltage. The system also comprises: (i) at least one node for providing a potential in response to the first voltage and the second voltage; (ii) monitoring circuitry for detecting the first voltage exceeding a threshold; and (iii) disabling circuitry, for disabling the second voltage supply in response to the monitoring circuitry detecting the first voltage exceeding a threshold.

Numerous other inventive aspects are also disclosed and claimed.

DETAILED DESCRIPTION OF EMBODIMENTS

Figure 1:
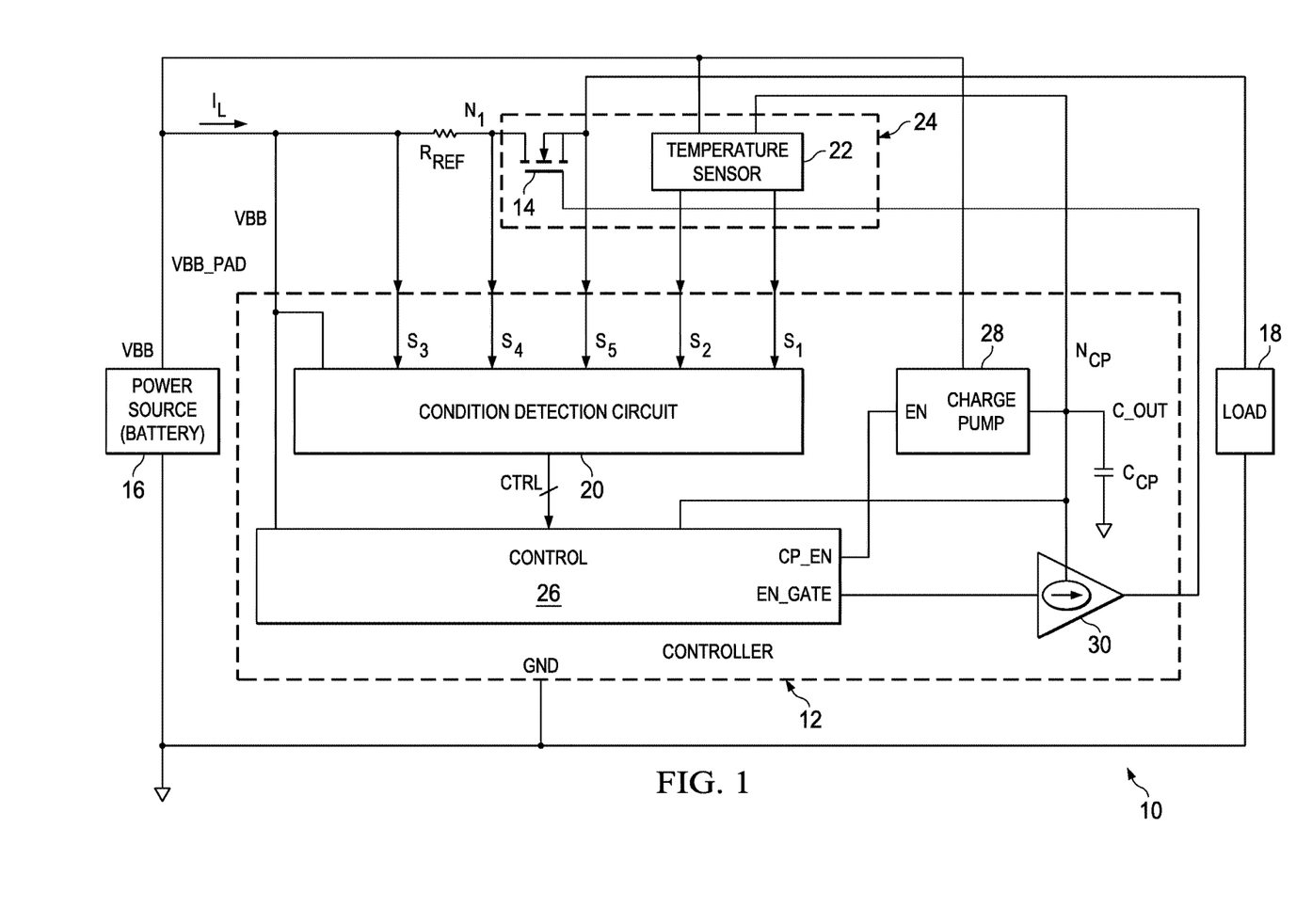
FIG. 1 illustrates a preferred embodiment system 10 including circuitry for detecting and discharging a supply node (e.g., charge pump) output.

FIG. 1 illustrates an electrical block diagram of a preferred embodiment system 10, including circuitry for detecting and responsively discharging a supply node (e.g., charge pump) output. System 10 includes a digital controller 12, which may be constructed of various devices so as to achieve the functionality described below. For example, digital controller 12 may be implemented as part of a processor (including appropriate programming) or as an integrated circuit module, akin in some respects to commercially available power controllers that are used in connection with thermal or power detection of an associated power transistor. Indeed, in FIG. 1, digital controller 12 is connected to a power transistor 14 and, as detailed below, controller 12 may detect power transients that could affect transistor 14. Moreover, in response to such detection, controller 12 may temporarily discharge the transient and reduce the supplied power, with additional options including masking potentially errant signals during the response to the transient and sensing and responding to other circuit operational events. As such functionality may be incorporated on a single integrated circuit die, digital controller 12 in FIG. 1 is shown enclosed by a dashed rectangle as representing one possible integrated circuit packaging of the functionality of that device.

Looking to device connectivity in FIG. 1, digital controller 12 is powered between a DC reference voltage VBB from a power source 16 and ground. The reference supply voltage is identified by convention of VBB as if a battery power provides the voltage, such as would be the case in a vehicle application of system 10. Further, power source 16 is connected to a node VBB_PAD, representing for example a typical high side electrical connection, which as described earlier in the Background of the Invention section of this document may incur transient spikes, due for example to inductive loading on the node. Node VBB_PAD is connected through, and provides a load current $I_L$ to, a reference resistor $R_{REF}$ and through the source/drain path of transistor 14 to a load 18. Load 18 may represent one or more of various types of electrical or electronic apparatus.

Digital controller 12 preferably includes a condition detection circuit 20. Condition detection circuit 20 has one or more circuit parameter sensing inputs, where in the example illustrated five such inputs $S_1$ through $S_5$ are shown. Sensing inputs $S_1$ and $S_2$ are connected to receive a differential voltage from a temperature sensor 22 (e.g., thermal diode) that is associated with, and preferably integrated onto a same circuit die 24 as, transistor 14, as further detailed later. Sensing input $S_3$ is connected to, and is for sensing, the potential at a node VBB_PAD, that is, at a first terminal of resistor $R_{REF}$. Sensing input $S_4$ is connected to, and is for sensing, the potential at a node $N_1$, which is connected between a second terminal of resistor $R_{REF}$ and the drain of transistor 14. Sensing input $S_5$ is connected to, and is for sensing, the potential at the source of transistor 14.

In a preferred embodiment, condition detection circuit 20 is operable to detect one or more operational parameters associated with transistor 14, so as to protect that device from conditions that could violate its specifications or other safe operating area conditions. For example, in connection with sensing inputs $S_1$ and $S_2$, condition detection circuit 20 can detect an absolute temperature of transistor 14, or a relative temperature of transistor 14 compared to digital controller 12, and then it compares the detected temperature to a threshold. If the threshold is exceeded, condition detection circuit 20 is connected, and operable to provide a control signal CTRL, to a control block 26 that is also a part of controller 12, as further detailed below. As another example, in connection with sensing inputs $S_3$ and $S_4$, condition detection circuit 20 can evaluate a measure of current $I_L$, such as by dividing the potential across resistor $R_{REF}$ (i.e., as sensed between inputs $S_3$ and $S_4$) by the known resistance of that resistor. Moreover, condition detection circuit 20 may compare the measured current (and optionally, power) to a safe operating threshold and, in that event that threshold is exceeded, circuit 20 again can assert a signal CTRL to control block 26. As a final example, in connection with sensing inputs $S_4$ and $S_5$ condition detection circuit 20 can evaluate voltage across (or current through) transistor 14, thereby associated with power or energy. Again, condition detection circuit 20 may compare this measured parameter to a safe operating threshold and, in that event that threshold is exceeded, circuit 20 again can assert a signal CTRL to control block 26.

Digital controller 12 also preferably includes a charge pump 28. Charge pump 28 may be constructed according to manners known in the art. Also as known, a charge pump is a kind of DC-to-DC converter that uses capacitors as energy-storage elements to create either a higher- or lower-voltage power source. Thus, whereas charge pump 28 receives the voltage VBB, it uses some form of switching device(s) to control the connection of voltages to internal capacitors to produce an added voltage offset to VBB, which is presented as a final output voltage, CP_OUT, to a node $N_{CP}$. Thus, under normal operating conditions, CP_OUT>VBB by the difference added by charge pump 28, which in a contemporary vehicle application may be approximately 13V. Moreover, the total output voltage CP_OUT can be stored on a charge pump output capacitor $C_{CP}$, which is connected between node $N_{CP}$ and ground. Note also that charge pump 28 receives an enable input signal CP_EN from control circuit 26, so that when CP_EN is asserted, charge pump 28 is enabled and operates toward outputting voltage CP_OUT, and conversely when CP_EN is de-asserted, charge pump 28 is disabled. Lastly, node $N_{CP}$, and thus voltage, CP_OUT when charge pump 28 is enabled, is connected to control block 26 so as to be monitored for transients and also to a gate driver 30, both of which functions are detailed below.

Gate driver 30 is a power amplifier that, as further described below, is selectively enabled by a low-power enable input signal EN_GATE from control block 26. Thus, when EN_GATE is asserted, and in response and from the bias of CP_OUT, gate driver 30 produces a high-current drive output signal. In this regard, the output of gate driver 30 is connected to the gate of the high-power transistor 14. In differing preferred embodiments, gate driver 30 can be provided on-chip (e.g., on controller 12) or as a discrete module.

Returning to the output of charge pump 28 and node $N_{CP}$, that node is also connected as one bias potential to temperature sensor 22. In a preferred embodiment, the temperature-detecting function of sensor 22 is achieved by a thermal diode (not separately shown in FIG. 1), which has it anode connected to node $N_{CP}$, and its cathode connected to node VBB_PAD. Thus, under normal operation, the higher bias voltage at node $N_{CP}$ (i.e., CP_OUT) forward biases this diode relative to its cathode at the VBB potential, and the amount of voltage across the diode is sensed by sensing inputs $S_1$ and $S_2$ of control block 26, thereby providing a signal representative of absolute temperature of transistor 14. Note that integrating temperature sensor 22 onto a same integrated circuit package 24 as transistor 14 is available in commercial form as a NEXFET Power MOSFET package, commercially available from Texas Instruments Incorporated.

The general operation of system 10 is now described and introduced, where additional details are described later in connection with schematics that depict various preferred embodiment implementations of certain of the blocks in control block 26, while other blocks and functions may be readily implemented in manners ascertainable by one skilled in the art. General operations of system 10 are under control of control block 26. Thus, under normal conditions, control block 26 enters and completes a start-up process, where this process and subsequent operations can be achieved, for example, via a state machine in control block 26. Thus, start-up may involve a memory register read and one or more enabling signals to system 10 or controller 12 that are not separately shown, and a powering up of the blocks in some predefined order. In any event, at some point in the start-up sequence, charge pump 28 is enabled and its output potential CP_OUT rises from zero to its full potential, and node $N_{CP}$ is charged accordingly. Also, control block 26 asserts EN_GATE, thereby enabling gate driver 30 which in turn drives the gate of, and thereby enables, transistor 14, so that current $I_L$ begins to flow through that transistor and to load 18. As current $I_L$ begins or continues to flow, condition detection circuit 20 may, in different preferred embodiments, monitor for various different types of events that may pose a risk to either transistor 14 or load 18. For example, any one or more of transistor temperature, transistor current, transistor power, or transistor energy may be monitored, and if they violate a threshold or other safe operating area boundary, detection circuit 20 asserts a signal CTRL to control block 26. In response to the asserted CTRL, control block 26 can de-assert EN_GATE, thereby also disabling gate driver 30 and transistor 14, thereby stopping the flow of current $I_L$ in an effort to stop or reduce the potential effect of the detection condition(s). Once the detected condition subsides, or after a passage of time, transistor 14 may be re-tried, that is, re-enabled by control block 26 re-asserting EN_GATE, with current $I_L$ then being enabled to flow again, and condition detection circuit 20 again monitoring for this and any subsequent time of such current flow, in the same manner as described above. Successive detected conditions also may cause other responses, but such actions need not be described in this document so as to focus the discussion on other preferred embodiment aspects, as further explored below.

Also during normal operation of system 10, control block 26 includes circuitry that monitors, and potentially responds to transients or spikes, in the CP_OUT voltage at node $N_{CP}$. More particularly, under normal operating conditions, and as detailed earlier, the CP_OUT voltage represents an additive offset voltage to the VBB voltage, where in a common example nominally VBB=13V and the added voltage from charge pump 28 also may be 13V, so that the total CP_OUT voltage is 26V (i.e., 13+13=26V). However, as also detailed in the Background of the Invention section of this document, transients may occur in VBB, for example due to cable or other load inductances, whereby VBB spikes upward. Thus, in the example where a VBB spike provides an additional 55V, the 55V spike adds to the nominal 26V, for a total of an 81V output at node $N_{CP}$. In this regard, therefore, control block 26 monitors node $N_{CP}$ and detects if the voltage at that node exceeds a voltage threshold. For example, if the voltage of 81V is potentially damaging to parts of system 10, then the voltage threshold of control block 26 may be set to 80V and, if the node $N_{CP}$ voltage meets or exceeds this voltage threshold, preferably control block 26 detects this condition and takes corrective action. In one preferred embodiment, a responsive corrective action is to responsively and temporarily de-assert CP_EN, thereby disabling charge pump 28 and, hence, reducing the total voltage by eliminating the voltage offset (e.g., 13V) provided by charge pump 28. Thus, during this temporary period, the potential from VBB, including its potential spike, may continue to power certain devices in system 10, but the additive voltage from charge pump 28 is suppressed from the system. Moreover, after a controlled delay period, the temporary disablement ends and charge pump 28 is re-enabled, with the controlled delay period being sufficient to allow the spike to pass and any high voltage node to be discharged. Indeed, with respect to the latter, also in a preferred embodiment, another responsive corrective action is to discharge the potential at node $N_{CP}$, as the overall capacitance at that node (e.g., from capacitor $C_{CP}$ and also possibly the gate-to-source and gate-to-drain capacitances of transistor 14) would tend to charge to the potentially-damaging potential from the spike (e.g., 81V). Thus, this additional corrective action discharges any residual charges on the high voltage node(s). With the detection and protection steps, internal devices of system 10 have more immunity against fast transient high voltage supply disturbances. Lastly, in still another preferred embodiment, another responsive corrective action is to account for any other device(s) that may be affected by the temporary cessation of the charge pump voltage. For example, in system 10, and as noted above, temperature sensor 22 relies, in part, on the potential at node $N_{CP}$, and indeed to forward bias the diode in sensor 22, that potential must remain above VBB. Hence, according to another preferred embodiment, during a period in which charge pump 28 is disabled, control block 26 also inhibits actions that otherwise are taken in response to temperature monitoring, as it is recognized that during that period, such monitoring may provide inaccurate indications due to the disabling of charge pump 28. Further details in this regard, as well as relating to each of the preferred embodiment corrective actions introduced above, are further explored below.

Figure 2:
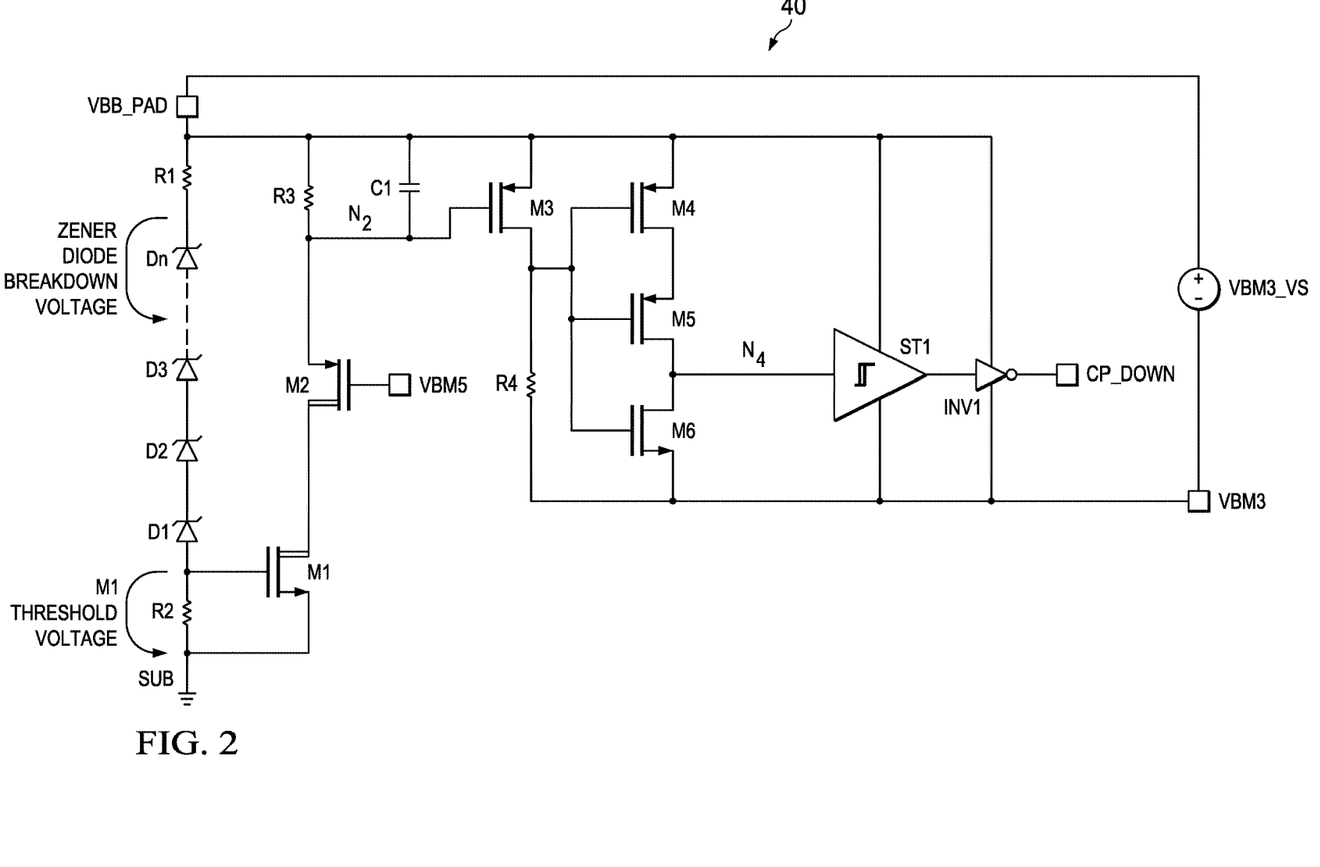
FIG. 2 illustrates a schematic of a preferred embodiment voltage transient detection circuit 40, as may be implemented as part of control block 26 in FIG. 1.

FIG. 2 illustrates a schematic of a preferred embodiment voltage transient detection circuit 40, as may be implemented as part of control block 26 in FIG. 1. Circuit 40 includes node VBB_PAD introduced in FIG. 1, and it is connected to a first terminal of a resistor R1. A second terminal of resistor R1 is connected to a cathode of a first Zener diode Dn in a series string of n Zener diodes, with FIG. 2 illustrating those as D1, D2, D3, . . . , Dn. Thus, within the diode string, a cathode of one diode is connected in series to an anode of a next diode, with the anode of the first diode, D1, connected to a first terminal of a resistor R2 and to the gate of an NMOS transistor M1. Transistor M1 is preferably a drain-extended device. The second terminal of resistor R2 is connected to ground, as is the source of NMOS transistor M1. The drain of NMOS transistor M1 is connected to the drain of a PMOS transistor M2, where transistor M2 is preferably a drain-extended device. The gate of PMOS transistor M2 is connected to a fixed potential, such as VBM5, which is regulated at 5V below VBB_PAD. The source of PMOS transistor M2 is connected to a node $N_2$. A resistor R3, and a capacitor C1, are both connected between node $N_2$ and node VBB_PAD. Node $N_2$ is also connected to the gate of a PMOS transistor M3, which has its source connected to node VBB_PAD and its drain is connected to a node $N_3$. Node $N_3$ is connected to the gate of each of PMOS transistors M4 and M5 and to the gate of an NMOS transistor M6. A resistor R4 is connected between node $N_3$ and a node VBM3, which is regulated at 3.5V below VBB_PAD, as shown also by the voltage source VBM3_VS in FIG. 2. The source of NMOS transistor M6 is also connected to node VBM3, and the drain of NMOS transistor M6 is connected to a node $N_4$ that connects to the drain of PMOS transistor M5 and also to the input of a Schmitt trigger ST1. The source of PMOS transistor M5 is connected to the drain of PMOS transistor M4, and the source of PMOS transistor M4 is connected to node VBB_PAD. The Schmitt trigger ST1 is powered between nodes VBB_PAD and VBM3, and its output is connected to the input of an inverter INV1. The output of inverter INV1 provides a signal CP_DOWN, which as detailed below is asserted when VBB spikes above a threshold, and preferably the signal CP_DOWN is used to disable CP_EN (of FIG. 1), so as to disable charge pump 28.

The operation of the FIG. 2 voltage transient detection circuit 40 is now described. In this regard, recall the earlier discussion noted that control block 26 includes circuitry that monitors, and potentially responds to spikes, in the CP_OUT voltage at node $N_{CP}$; voltage transient detection circuit 40 serves in this capacity, with a specific implementation that is now described. A Zener diode has a well-defined breakdown voltage, and also its edge rate of current rising at avalanche point is very high. Thus, with circuit 40 implementing Zener diodes D1 through Dn in series, a desired threshold detection of a fast transient response time is achieved at node VBB_PAD based on the number n of diodes. Particularly, as the voltage at VBB_PAD is increased, the Zener diodes would start breaking down and current with flow through them from the relatively large reverse bias. As a result of the current, a voltage drop occurs across resistors R1 and R2, and the voltage drop across resistor R2 drives the gate of NMOS transistor M1. Once the voltage drop across resistor R2 rises higher than the threshold voltage of NMOS transistor M1, transistor M1 starts conducting current. Since PMOS transistor M2 is already enabled by VBM5 (i.e., 5V below VBB), then the current conducted by transistors M1 and M2 flows through resistor R3, creating a voltage across resistor R3. The voltage drop across R3 (i.e., VBB–VR3) is applied to the gate of PMOS transistor M3, so as that drop increases, PMOS transistor M3 conducts. Also in this context, note that capacitor C1 is located to absorb certain fluctuations at VBB_PAD so that voltage coupling from that supply to the gate of NMOS transistor M3 will not falsely trigger circuit 40, that is, were the supply voltage to have a sudden voltage spike, the Vgs of NMOS transistor M3 could be increased over the threshold voltage of that transistor because of a current via resistor R3, so capacitor C1 reduces the possibility of such an occurrence. With PMOS transistor M3 enabled, current flows through resistor R4, thereby creating a potential to node N3, and thus to the gates of each of PMOS transistors M4 and M5, turning each of those transistors off and turning on NMOS transistor M6, thereby connecting VBM3 to the input of Schmitt trigger ST1. As is known in the art, a Schmitt trigger is a comparator with hysteresis that converts an analog input signal to a digital output signal, and its output retains its value until its input changes sufficiently to trigger a change. Thus, when node $N_4$ is connected through NMOS transistor M6 to VBM3, its output is triggered to transition from high to low. Moreover, the low output is inverted by inverter INV1, so that CP_DOWN is thus asserted high in response to the sequence of events that began with the spike at VBB_PAD. In opposite fashion, note that once VBB at node VBB_PAD gets lower than the breakdown voltage of the series-connected diode stack (i.e., D1 to Dn), transistors M1 and M3 will be turned off and the input to Schmitt trigger ST1 will transition from low to high, in which case that signal is also inverted by inverter INV1 and CP_DOWN thus goes low. Thus, voltage transient detection circuit 40 monitors the voltage at node VBB_PAD, detects a spike at that node, and responds to the detection by a positive assertion of CP_DOWN. As detailed below, CP_DOWN is thus usable to take further actions in response to the detected supply transient.

Figure 3:
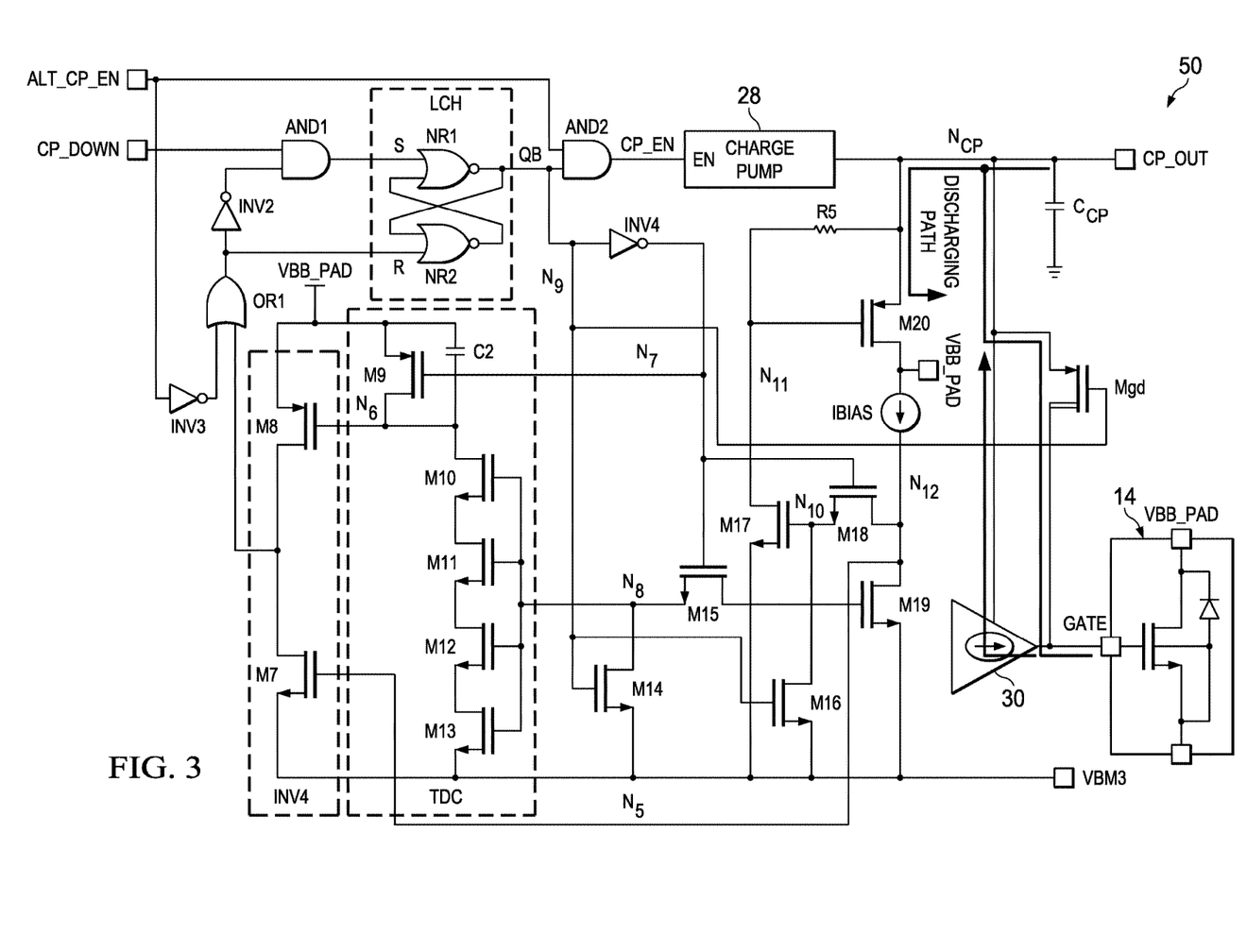
FIG. 3 illustrates a schematic of a preferred embodiment timed charge pump control circuit 50, as also may be implemented as part of control block 26 in FIG. 1.

FIG. 3 illustrates a schematic of a preferred embodiment timed charge pump control circuit 50, as also may be implemented as part of control block 26 in FIG. 1. The CP_DOWN signal from circuit 40 of FIG. 2, which recall is asserted when a spike is detected at VBB_PAD, is, as shown in FIG. 3, connected as an input to an AND gate AND1. A second input to AND gate AND1 is received from an output of an inverter INV2. The output of AND gate AND1 is connected as a set (S) input to a latch LCH, which comprises two cross-coupled NOR gates NR1 and NR2, and the reset (R) input to latch LCH is connected to the input of inverter INV2. The inverting output QB of latch LCH is connected as a first input to an AND gate AND2, and the second input of AND gate AND2 is connected to receive a signal ALT_CP_EN. Thus, the inverting QB output of LATCH LCH, which is responsive in part to CP_DOWN, and the signal ALT_CP_EN, both control the output state CP_EN of AND gate AND2, which is connected to an enable ("EN") control pin of charge pump 28; thus, each of the CP_DOWN and ALT_CP_EN signals represents an alternative signal that can disable (if de-asserted), or combine (if asserted) to enable, charge pump 28. As introduced earlier in FIG. 1, the voltage output from charge pump 28, CP_OUT, is connected to a node $N_{CP}$, which is connected to a gate driver 30 that has an output connected to a gate of transistor 14. Additionally, however, and as detailed below, node $N_{CP}$ is also connected to other devices, so as to permit a selective discharge of that node when CP_DOWN is asserted (i.e., in the event of a detected transient in VBB_PAD).

The input of inverter INV2 is connected to the output of an OR gate OR1, and as discussed earlier also to the reset (R) input of latch LCH. One input of OR gate OR1 is connected to an output of an inverter INV3, which has its input connected to the ALT_CP_EN signal. Another input of OR gate OR1 is connected to an output of an inverting circuit INV4. The output node of inverting circuit INV4, connected as an input to OR gate OR1, is connected to the drain of an NMOS transistor M7 and to the drain of a PMOS transistor M8. The source of NMOS transistor M7 is connected to VBM3, and the source of PMOS transistor M8 is connected to VBB_PAD. The gate of NMOS transistor M7 is connected to a node $N_5$, and the gate of PMOS transistor M8 is connected to a node $N_6$.

Inverting circuit INV4 is driven by a time delay circuit TDC. Circuit TDC includes a PMOS transistor M9 having a source connected to VBB_PAD, a gate connected to a node $N_7$, and a drain connected to node $N_6$. A capacitor C2 is connected between the source and drain of PMOS transistor M9. Between node $N_6$ and node VBM3 are connected four NMOS transistors M10, M11, M12, and M13, so that the source/drain paths of these devices are in series. Thus, starting at one end of this series connection, the drain of NMOS transistor M10 is connected to node $N_6$, and the source of NMOS transistor M10 is connected to the drain of NMOS transistor M11. The source of NMOS transistor M11 is connected to the drain of NMOS transistor M12, and the source of NMOS transistor M12 is connected to the drain of NMOS transistor M13. The source of NMOS transistor M13 is connected to node VBM3. Lastly, the gates of all four NMOS transistors M10, M11, M12, and M13 are connected to a node $N_8$.

With respect to the remaining devices in circuit 50, node $N_7$ is connected to the output of an inverter INV4, and the input of inverter INV4 is connected to a node $N_9$, which is also connected to the inverting output QB of latch LCH. Node $N_9$ is also connected to the gate of an NMOS transistor M14. The source of NMOS transistor M14 is connected to node VBM3, and the drain of NMOS transistor M14 is connected to node $N_8$. Node $N_8$ is also connected to the source of an NMOS transistor M15. The gate of NMOS transistor M15 is connected to node $N_7$, and the drain of NMOS transistor M15 is connected to node $N_5$. Node $N_9$ is also connected to a gate of an NMOS transistor M16. The source of NMOS transistor M16 is connected to node VBM3, and the drain of NMOS transistor M16 is connected to a node $N_{10}$. Node $N_{10}$ is also connected to the gate of an NMOS transistor M17, which has its source connected to node VBM3 and its drain connected to a node $N_{11}$. Node $N_7$ is also connected to the gate of an NMOS transistor M18, which has its source connected to node $N_{10}$ and its drain connected to a node $N_{12}$. Node $N_{12}$ is also connected to both the gate and drain of an NMOS transistor M19, which has its source connected to node VBM3. A current source IBIAS is connected between node VBB_PAD and node $N_{12}$. A resistor R5 is connected between node $N_{11}$ and node $N_{CP}$. Node $N_{11}$ is also connected to the gate of a PMOS transistor M20, which has its source connected to node $N_{CP}$ and its drain connected to node VBB_PAD. Lastly, a PMOS transistor Mgd has its source connected to node $N_{CP}$, its drain connected to the gate of transistor 14, and its gate connected to node $N_9$.

The operation of the FIG. 3 timed charge pump control circuit 50 is now described. In this regard, recall the earlier discussion noted that control block 26, in a preferred embodiment, provides a responsive corrective action is to responsively and temporarily de-assert CP_EN, thereby disabling charge pump 28; timed charge pump control circuit 50 serves in this capacity, and additionally during an overlapping time it operates to discharge the highly charged $N_{CP}$ node, with a specific implementation that is now described.

The operation of charge pump control circuit 50 during normal operations is first examined, that is, when VBB is not experiencing a detected transient. First, at start-up, ALT_CP_EN is low and CP_DOWN is low. The low CP_DOWN causes the output of AND gate AND1 also to be low, thereby inputting a low value to the set input of latch LCH. At the same time, the low ALT_CP_EN is inverted by inverter INV3 to a high input to OR gate OR1, which therefore outputs a high value to the reset input of latch LCH. Thus, inverting latch LCH output QB is a high value and in input to AND gate AND2, which is also contemporaneously receiving the low ALT_CP_EN, so an output CP_EN is low to charge pump 28, keeping it disabled. Following start up in normal operations, ALT_CP_EN transitions from low to high, and additionally, the potential at node VBB_PAD will be at some nominal value such as 13V. Thus, the transition in ALT_CP_EN to high combines with inverting latch output QB of high so that AND gate AND2 output CP_EN transitions high, thereby enabling charge pump 28. At this point, therefore, the CP_OUT potential at node $N_{CP}$ will be at some nominal value, such as 26V (i.e., 13V from VBB and 13V from the added voltage of the charge pump). The node $N_{CP}$ voltage is applied to gate driver 30, which enables transistor 14. Meanwhile, because a VBB spike has not been detected, then CP_DOWN remains de-asserted (i.e., low), so the inverting output QB of latch LCH remains at a high value. Note now also the effect of this high value in other transistors in circuit 50. Specifically, this logic high is connected to the gate of NMOS transistor M14 causing it to conduct VBM3 to the gates of NMOS transistors M10 through M13, so those transistors are off; at the same time, the logic high at the inverting output QB from latch LCH is inverted by inverter INV4, thereby outputting a logic low at node $N_7$ and to the gate of PMOS transistor M9, thereby enabling that transistor and charging capacitor C2 and node $N_6$ to VBB_PAD. The node $N_6$ to VBB_PAD maintains PMOS transistor M8 off, while at the same time NMOS transistor M7 is always maintained on, so the output of inverting circuit INV4 is low. Additionally, the low output of inverting circuit INV4 is connected as an input to OR gate OR1, thereby not changing the already low output of that gate. Thus, during this time, ALT_CP_EN is presumed to remain asserted (barring some other basis for de-asserting it) and the inverting latch output QB is high, so that CP_EN is high and charge pump 28 remains enabled, thereby sustaining normal circuit operation, that is, without the detection of a transient at VBB_PAD.

The operation of charge pump control circuit 50 in response to a VBB_PAD-detected transient is now examined, in part as it relates to disabling charge pump 28 following the transient detection. From the earlier discussion of FIG. 2, under these conditions, CP_DOWN is asserted, thereby applying a logic high to one input of AND gate and AND1, and recall from the above discussion that from the immediately-prior normal operations (i.e., prior to detecting the transient), the output of inverter INV2 also was a logic high. Thus, when CP_DOWN is asserted, both inputs of AND gate AND1 are high, thereby causing the output of AND gate AND1 to transition from low (as it was during normal operations) to high. This high AND gate AND1 output, is connected to the set input of latch LCH, while at the time of the VBB transient detection, the output of OR gate OR1 remains low, since ALT_CP_EN is enabled and the output of inverting circuit INV4 is low, and thus the reset input of latch LCH is low. Thus, the inverting output QB of latch LCH goes low and that is input to AND gate AND2, causing CP_EN to go low. Since CP_EN is an input to the EN input of charge pump 28, the CP_EN transition to low thereby disables charge pump 28. At this point, therefore, and as illustrated in additional detail later, note that a reaction to the assertion of CP_DOWN (i.e., of the VBB transient detection) is to disable charge pump 28; thus, the additive voltage previously provided by charge pump 28 (e.g., 13V) is shut off almost immediately in response to having detected the VBB transient. Thus, rather than allowing node $N_8$, to charge to the full value of the transient voltage (e.g., 68V) plus the charge pump voltage (e.g., 13V), instead node $N_{CP}$ only should experience the transient voltage or some slight overshoot during the relatively short time that occurs before charge pump 28 is disabled. As a result, therefore, devices connected to node $N_{CP}$, including in the preferred embodiment gate driver 30 and transistor 14, are immunized from the full voltage that could occur were the charge pump voltage added to the transient, which could be 81V (i.e., 68V+13V=81V).

The further operation of charge pump control circuit 50 in response to a VBB_PAD-detected transient is now examined, as it relates to discharging a high voltage node(s) following the transient detection. Particularly, recall when CP_DOWN is asserted, the inverting output QB of latch LCH at node $N_9$ goes low, which enables PMOS transistor Mgd, which is so designated as it is enabled to thereby discharge the gate capacitance at transistor 14. Further, the low inverting output QB of latch LCH at node $N_9$ is inverted to node $N_7$ to go high. The high at node $N_7$ enables NMOS transistor M18, thereby connecting VBB_PAD of node $N_{12}$ to the gate of NMOS transistor M17 and enabling it; hence, a current mirror of current source IBIAS occurs through NMOS transistor M17 as mirrored through NMOS transistor M19. With current flowing through NMOS transistor M17, a voltage is dropped across resistor R5, and once that voltage drop meets the threshold voltage of PMOS transistor M20, then PMOS transistor M20 conducts node $N_{CP}$ to node VBB_PAD, thereby creating the discharge path shown in the darkened arrow line in FIG. 3. Thus, a discharge path is enabled so that any residual charge at node $N_{CP}$, from the transient or any overshoot from charge pump 28, is shunted to node VBB_PAD. Hence, additional protection is implemented against a larger voltage reaching devices connected to node $N_{CP}$.

Still further operation of charge pump control circuit 50 in response to a VBB_PAD-detected transient is now examined, now as it relates to a time delay before re-enabling charge pump 28 following having disabled it after the transient detection. Specifically, recall when CP_DOWN is asserted, the inverting output QB of latch LCH at node $N_9$ goes low and the charge pump 28 is disabled. Thereafter, the transient will begin to subside, so eventually CP_DOWN will again become de-asserted to a low value. The low CP_DOWN is input to AND gate AND1, which will cause its output to transition from high to low and that low is connected to the set input of latch LCH, while in the meantime the reset input to latch LCH also remains low, so the previous inverting output QB state of low is maintained. Thus, both with respect to the asserted CP_DOWN, and when it is thereafter initially de-asserted, the inverting output QB of latch LCH is low, and that low is inverted to node $N_7$ to go high. The high at node $N_7$ enables NMOS transistor M15, thereby connecting VBB_PAD to the gates of NMOS transistors M10 through M13. As each of those transistors turns on, a time delay occurs from the connection of the series-path of those transistors, and capacitor C2, between VBB_PAD and VBM3. The time delay, for example, may be in the range of 20 to 40 μsec, based on device selection. After that delay, node N6 will sufficiently decline so as to enable PMOS transistor M8. When PMOS transistor M8 enables, it along with the always-enabled M7 forms a current mirror, relative to NMOS transistor M19, according to the mirror ratio. In a preferred embodiment the drain current of PMOS transistor M8 is significantly larger than the drain current of NMOS transistor M7, so at this point the output of inverting circuit INV4 transitions high. This high output is connected as an input to OR gate OR1, causing its output to change to a logic high and that high is connected to the reset input of latch LCH; moreover, the high output of OR gate OR1 is inverted by inverter INV2 to apply a low input to AND gate AND1, thereby causing it to output a logic low to the set input of latch LCH—thus, the change in the output of inverting circuit INV4 causes a reset of latch LCH, so that its inverting output QB transitions from low to high. At this point, therefore, the operation returns to that described above under normal operation after ALT_CP_EN is enabled and CP_DOWN is de-asserted, that is, charge pump 28 is enabled as is transistor 14. In other words, the high value at inverting output QB combines with the high value of ALT_CP_EN, thereby asserting CP_EN and re-enabling charge pump 28. Thereafter, operations are returned to normal and nominal values as described earlier, unless or until another spike in VBB occurs. From the above, therefore, and as further illustrated in FIG. 4, circuit 50 re-enables charge pump 28 after a VBB spike is detected and a time period from circuit TDC elapses.

Figure 4:
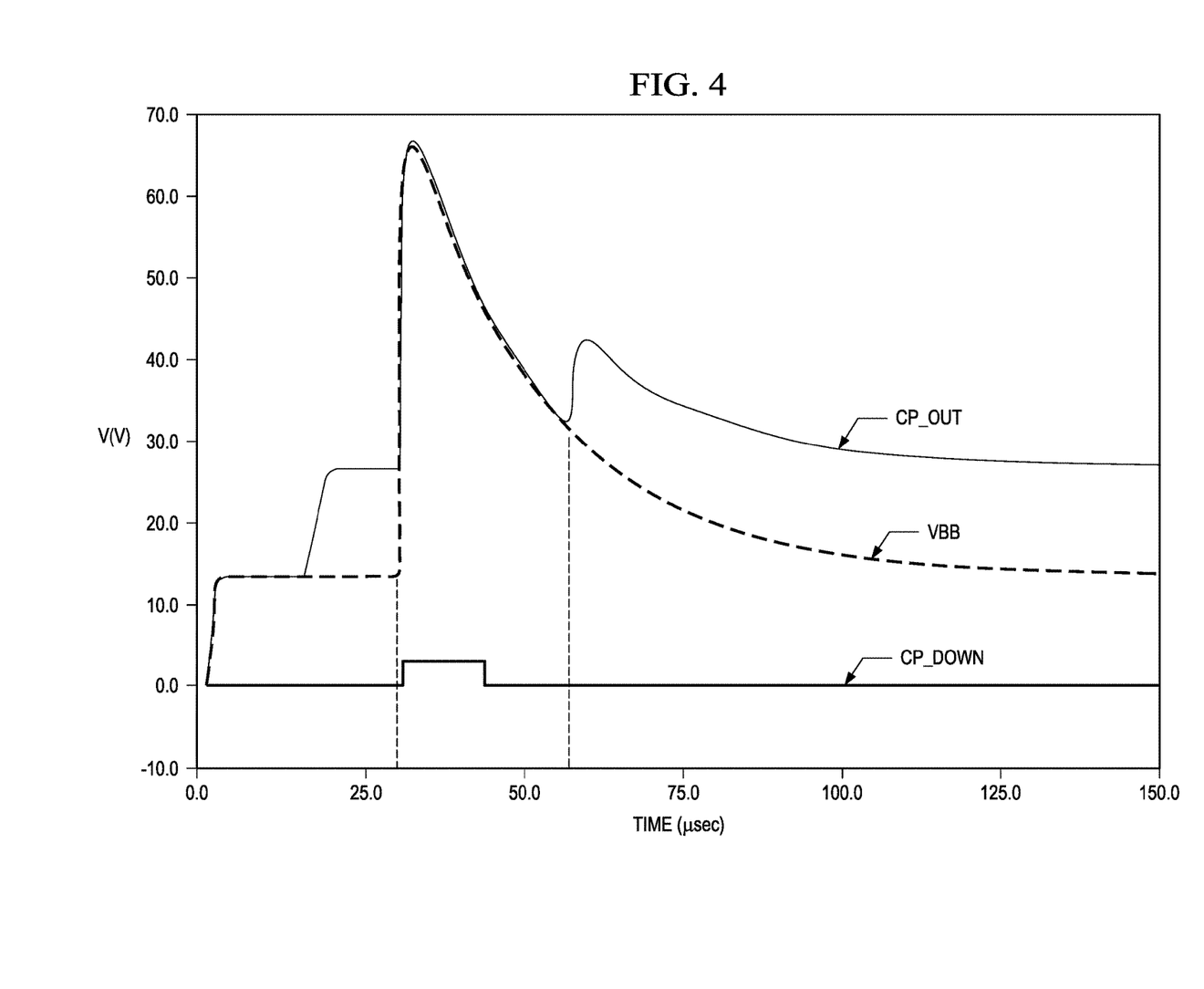
FIG. 4 illustrates a simulated signal timing diagram of various of the operations of circuits in FIGS. 1 through 3.

FIG. 4 illustrates a simulated signal timing diagram of various of the operations described above, by way of summary and confirmation of certain preferred embodiment aspects. Specifically, FIG. 4 illustrates time (in microseconds) across its horizontal access and signal amplitude (in Volts) across its vertical axis. At time 0.0 μsec, the battery voltage at VBB begins to rise to a first plateau of approximately 13.5V, as shown between the approximate times of 2.5 to 15.0 μsec; during this same time period, charge pump 28 is not yet enabled, so the voltage CP_OUT at node $N_{CP}$ matches that of VBB. Around time 15.0 μsec, charge pump 28 begins to add its voltage to VBB, so the voltage CP_OUT at node $N_{CP}$ begins to increase by the additive voltage to reach a second plateau of approximately 27V, as shown between the approximate times of 20.0 to 30.0 μsec. At time 30.0 μsec, however, a transient occurs in VBB, which under the operation of voltage transient detection circuit 40 is detected and causes an increase at node CP_OUT; indeed, without the preferred embodiment aspects, that node would rise all the way to the transient voltage plus the operational voltage of charge pump 28. Per a preferred embodiment, however, the transient is detected also at approximately time 30.0 μsec, as shown by the assertion of the CP_DOWN signal along the bottom of the diagram. Thus, the asserted CP_DOWN near-immediately disables charge pump 28, so that the total voltage reached, at approximately time 30.0 μsec and in response to the transient, is only approximately 66V. As the transient subsides, so does the voltage CP_OUT at node $N_{CP}$, and approximately 14 μsec after the transient the CP_DOWN signal returns to being de-asserted. Recall, however, that timed charge pump control circuit 50 has a 20 to 40.0 μsec delay built into it before re-enabling charge pump 28, and the FIG. 4 timing diagram thus illustrates that delay between time 30.0 μsec and 57 μsec. At time 57 μsec, therefore, the timer of circuit TDC expires and charge pump 28 is enabled, so that thereafter its voltage is once again added to VBB. At that point, therefore, even though the duration of the transient has not entirely completed, the additive voltage of charge pump 28 to VBB, in total, still is a value (e.g., 42V) that is well within the tolerance of the circuit devices.

Figure 5:
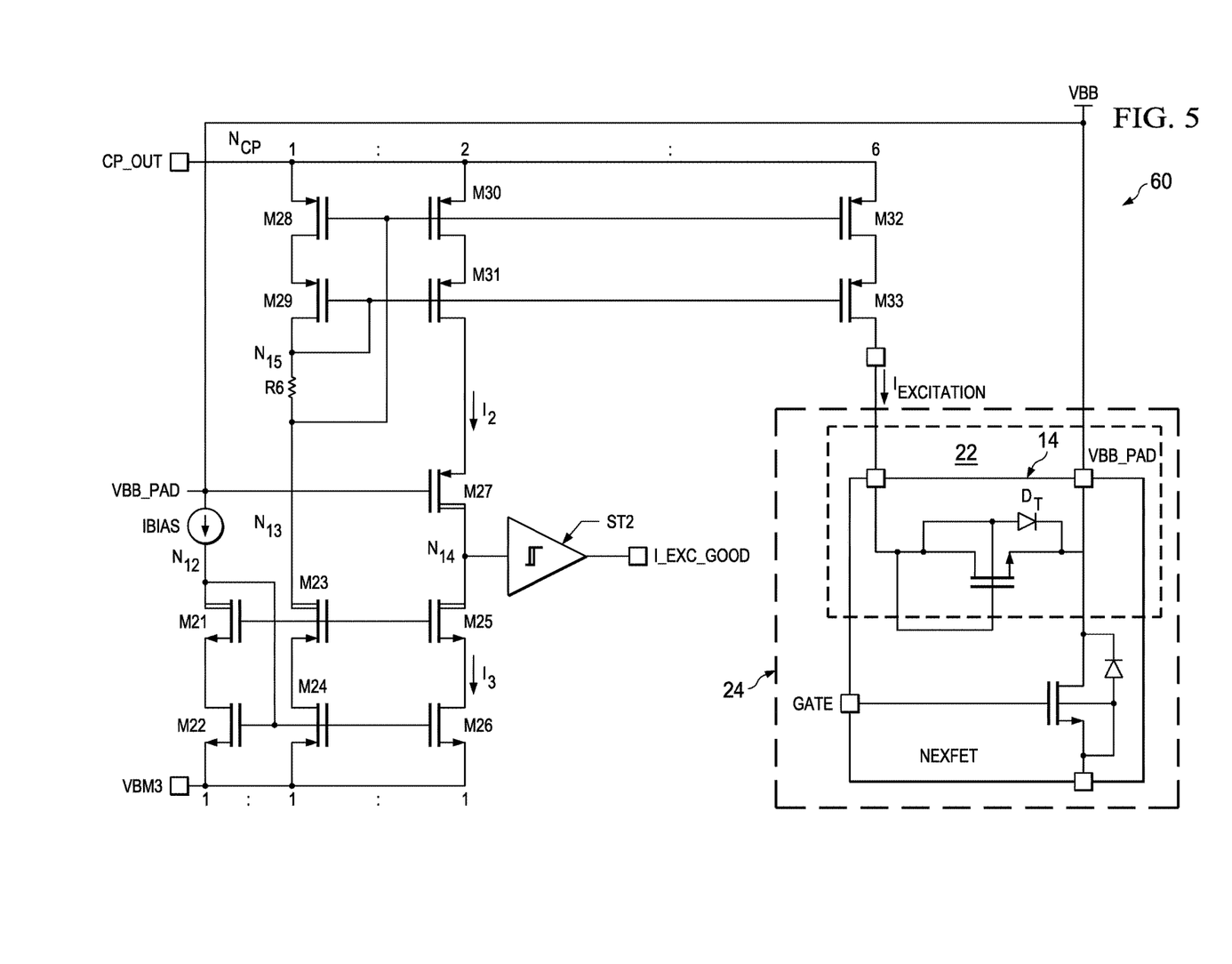
FIG. 5 illustrates a schematic of a preferred embodiment transient-responsive signal masking circuit 60, as also may be implemented as part of control block 26 in FIG. 1.

FIG. 5 illustrates a schematic of a preferred embodiment transient-responsive signal masking circuit 60, as also may be implemented as part of control block 26 in FIG. 1. Recall in FIG. 1 that both VBB and CP_OUT are shown connected to temperature sensor 22, and in FIG. 5 this connection is shown in greater detail. Particularly, CP_OUT is connected, via transistors detailed below, to the anode of a thermal diode $D_T$ that is part of temperature sensor 22, and VBB is connected to the cathode of that thermal diode. Specifically, when system 10 is implemented in a multi-chip-module with a NEXFET transistor package, the latter has a common drain (i.e., the substrate of the device should be the drain), so the cathode of the PN-junction needs to be connected to the substrate. Therefore, the anode of the thermal diode $D_T$ should be driven by a voltage source that has a higher voltage than the VBB supply voltage. In FIG. 5, therefore, charge pump 28 provides such a high voltage. As a result, the potential across thermal diode $D_T$ can be evaluated (e.g., through sensing inputs $S_1$ and $S_2$ in FIG. 1), as typically that potential is inversely relatable to temperature. As detailed below, however, this detected temperature can be inaccurate during periods when charge pump 28 is disabled, so circuit 60 includes circuitry and operation to respond accordingly.

Looking to the devices and connectivity toward the bottom left in the schematic of circuit 60 of FIG. 5, again illustrated is the VBB_PAD node, and connected to it is a current source IBIAS that outputs to a node $N_{12}$. Node $N_{12}$ is connected to the drain of an NMOS transistor M21, to the gate of an NMOS transistor M22, to the gate of an NMOS transistor M24, and to the gate of an NMOS transistor M26. The gate of NMOS transistor M21 is connected to the gate of an NMOS transistor M23 and to the gate of an NMOS transistor M25. The source of NMOS transistor M21 is connected to the drain of NMOS transistor M22, and the source of NMOS transistor M22 is connected to VBM3. The source of NMOS transistor M24 is connected to VBM3, and the drain of NMOS transistor M24 is connected to the source of NMOS transistor M23. The drain of NMOS transistor M23 is connected to a node $N_{13}$. The source of NMOS transistor M26 is connected to VBM3, and the drain of NMOS transistor M26 is connected to the source of NMOS transistor M25. The drain of NMOS transistor M25 is connected to a node N14. Node N14 is also connected as an input to a Schmitt trigger ST2, which outputs a signal I_EXC_GOOD, and, as demonstrated later, I_EXC_GOOD is asserted when an excitation current, $I_{excitation}$, is sufficient to drive temperature sensor 22. Node $N_{14}$ is also connected to the drain of a PMOS transistor M27, which has its gate connected to node VBB_PAD.

Looking to the devices and connectivity toward the upper half of the schematic of circuit 60 of FIG. 5, node $N_{13}$ is also connected to the gate of a PMOS transistor M28, to the gate of a PMOS transistor M30, and to the gate of a PMOS transistor M32, where the sources of each of those three PMOS transistors is connected to receive the CP_OUT potential from node $N_{CP}$. A resistor R6 is connected between node $N_{13}$ and a node $N_{15}$. Node $N_{15}$ is connected to the drain and gate of a PMOS transistor M29, to the gate of PMOS transistor M31, and to the gate of PMOS transistor M33, where the source of each of those transistors is connected to a respective drain of each of PMOS transistors M28, M30, and M32. The drain of PMOS transistor M31 is connected to the source of PMOS transistor M27. The drain of PMOS transistor M33 provides the excitation current, $I_{excitation}$, to the anode of the thermal diode $D_T$ of the temperature sensor 22 that is associated with transistor 14 (and preferably onto the same circuit die 24).

The operation of the FIG. 5 transient-responsive signal masking circuit 60 is now introduced, with specific device operation described next. In this regard, recall the earlier discussion noted that control block 26, in a preferred embodiment, optionally masks potentially errant signals during the response to a VBB transient; circuit 60 serves in this capacity. More particularly, when charge pump 28 is temporarily disabled or has not yet returned to sufficient about after it is re-enabled following a detected transient, it will not provide adequate drive current $I_{excitation}$. In the example of FIG. 5 such inadequate current, therefore, will not properly drive thermal diode $D_T$. Thus, circuit 60 is operable to de-assert I_EXC_GOOD after charge pump 28 is disabled and is temporarily providing inadequate excitation current, $I_{excitation}$, so that a de-asserted I_EXC_GOOD is used to control masking, or otherwise inhibiting a response to, any reading of temperature sensor 22 during such time. Thus, system 10 is masked or otherwise not permitted to cause a false positive of a high temperature condition that otherwise might trigger a thermal-related reaction (e.g., shutdown). Circuit 60, therefore, provides a specific implementation of such functionality, as is now described.

Figure 6:
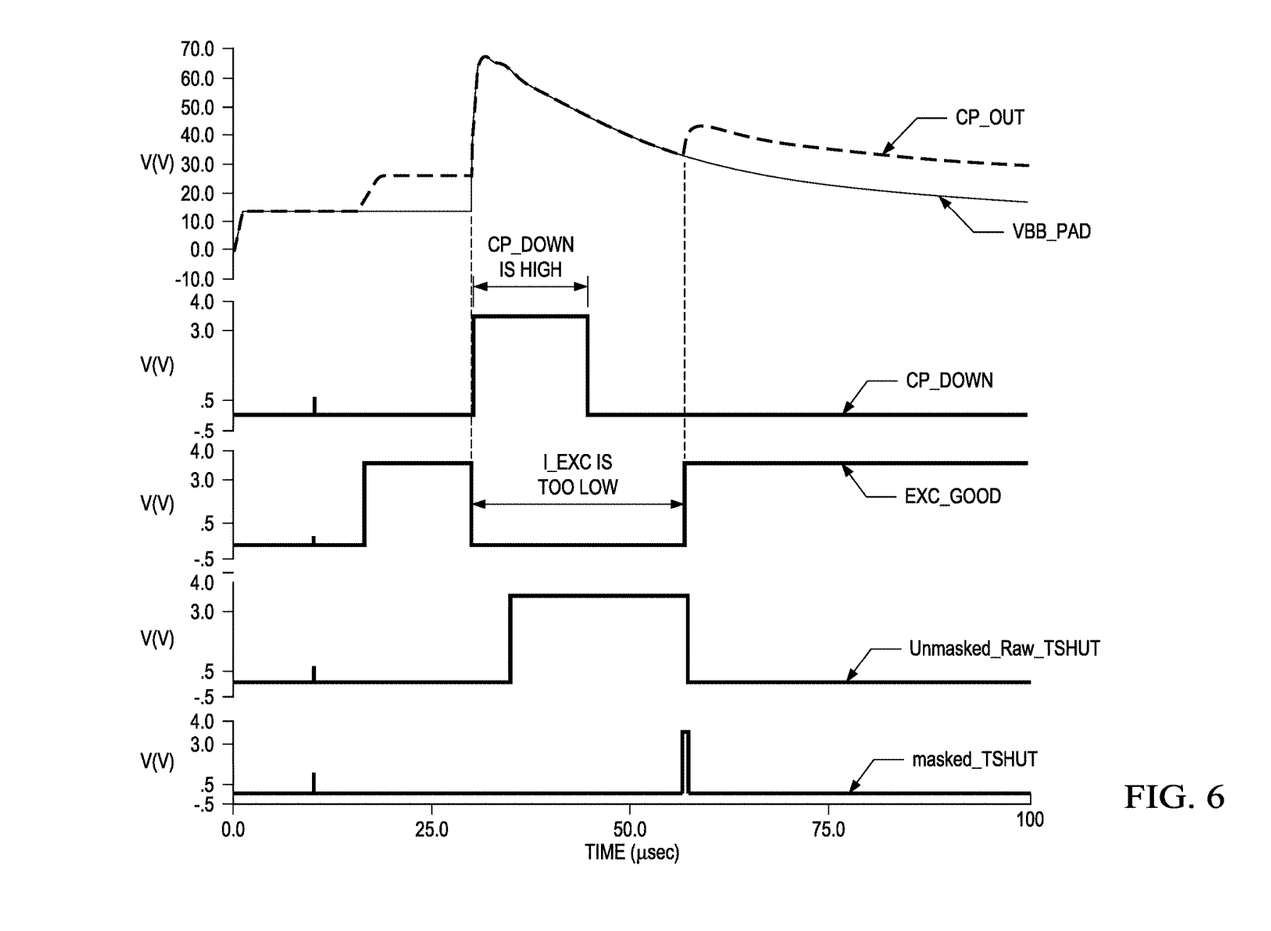
FIG. 6 illustrates a simulated signal timing diagram of various of the operations of circuit 60 of FIG. 5.

The specific circuit operation of transient-responsive signal masking circuit 60 is now detailed, further in combination with the illustration of FIG. 6. Specifically, FIG. 6 illustrates a simulated signal timing diagram of various of the operations of circuit 60, and it also includes the illustration from FIG. 4, where all signals again are shown in reference to time (in microseconds) across the horizontal access and signal amplitude (in Volts) across the vertical axis. In general, one skilled in the art will recognize that circuit 60 across the upper portion of the schematic includes three current mirroring vertical paths: (i) through PMOS transistors M28 and M29; (ii) through PMOS transistors M30 and M31; and (iii) through PMOS transistors M32 and M33. Similarly, circuit 60 includes across the lower portion of the schematic three current mirroring vertical paths: (i) through NMOS transistors M21 and M22; (ii) through NMOS transistors M23 and M24; and (iii) through NMOS transistors M25 and M26. Thus, when charge pump 28 remains enabled, voltage CP_OUT remains at a higher potential than that at node VBB_PAD. Schmitt trigger ST2 is in effect a current comparator, and during this time the current $I_2$ will be greater than the current $I_3$, thereby causing Schmitt trigger ST2 to assert I_EXC_GOOD active high, as can be seen in FIG. 6 from approximate times 17.0 μsec to 30.0 μsec. At time 30.0 μsec, as described earlier with respect to FIG. 4, a transient occurs, CP_DOWN is asserted and charge pump 28 is disabled. Thus, voltage CP_OUT drops toward VBB and hence now current I3 will exceed current I2, thereby causing Schmitt trigger ST2 to switch state and de-assert I_EXC_GOOD, as can be seen in FIG. 6 from approximate times 30.0 μsec to 58 μsec; during this time, therefore, note that FIG. 6 also illustrates the unmasked signal Unmasked_Raw_TSHUT from the voltage across thermal diode DT, where it can be seen that the signal rises due to the loss of the charge pump 28 bias; such a rise could be interpreted, therefore, as a temperature fault condition. In a preferred embodiment, however, while I_EXC_GOOD is asserted, it is used to mask the signal Unmasked_Raw_TSHUT, with the masked version Masked_TSHUT shown along the bottom plot of FIG. 6. Thus, in a system monitoring temperature, the Masked_TSHUT signal is used to trigger temperature-related faults, rather than the signal Unmasked_Raw_TSHUT. Thus, with the added preferred embodiment aspect described herein, the Masked_TSHUT signal does not indicate a fault condition, even when charge pump 28 is disabled (other than a possible negligible spike, which can be ignored by use of a state machine timer.

From the above, one skilled in the art should appreciate that preferred embodiments improve circuit reliability by detecting and mitigating high voltage transient events at the circuit voltage supply. Preferred embodiments have particular benefit in monitoring a voltage supply in a multiple supply (e.g., VBB and charge pump) system, and detecting if one of the supplies experiences a transient beyond a threshold. The response may include disabling one of the supplies. The response may further include discharging a node (e.g., high side supply node) so as to mitigate any stored charge from the transient. Still further, the response can mask one or more signals that may be temporarily inaccurate due either to the transient or the selective disabling of one of the supplies. Thus, the preferred embodiment proposed detection and protection circuit, internal devices may have more immunity against such fast transient high voltage supply disturbances by detecting the disturbance, shutting off the charge pump, and discharging any residual charges on high voltage nodes. The preferred embodiments also provide improvements over prior art brute-force approaches to protect internal devices against high voltage supply disturbances, where such approaches require a large silicon area to increase the break-down voltage limit. Moreover, the preferred embodiment approach is particularly beneficial in a charge pump system, as all the devices connected to the charge pump output are required to be strong enough to tolerate the full charge pump voltage on top of the supply disturbance if the charge pump is not turned off during supply disturbance. Still further, thx preferred embodiment may effectively detect a supply disturbance with a very high voltage edge, and the internal charge pump circuit is turned off until the supply voltage is settled down under a certain voltage threshold. Still further, the approach allows the charge pump voltage to be as high as it is needed, as the charge pump is turned off when supply voltage is disturbed by a high voltage peak, so any excess contribution from the charge pump is immediately avoided by the detection and pump disabling response. Further, whenever the charge pump is being turned off, a monitoring circuit can indicate that the charge pump voltage is too low, and this monitoring can prevent any malfunction because of low charge pump voltage. From the above, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A circuit reliability system, comprising:
   a first voltage supply input receiving a first voltage;
   a second voltage supply including a charge pump having an input coupled to the first voltage supply input, a disable input, and a second voltage supply output;
   monitoring circuitry having an input coupled to the first voltage supply input and having an output indicating the first voltage exceeding a threshold; and
   disabling circuitry having an input coupled to the monitoring circuitry output and a disable output coupled to the disable input, the disabling circuitry providing a disable signal on the disable output to the second voltage supply in response to the monitoring circuitry indicating the first voltage exceeding e the threshold.

2. The system of claim 1 including a battery coupled to the first voltage supply input.

3. The system of claim 1 in which the disabling circuitry provides the disable signal for a time period.

4. The system of claim 3 in which the time period is established at least in response to a series connection of source/drain paths of a plurality of transistors.

5. The system of claim 4 in which the time period is further established in response to a capacitance.

6. The system of claim 4 including circuitry for masking a parameter signal that is responsive to the second voltage supply during the time period.

7. The system of claim 6 including a temperature sensor, in which the parameter signal is representative of temperature.

8. The system of claim 1 in which the monitoring circuitry includes a plurality of series-connected Zener diodes.

9. The system of claim 1 including a power transistor, in which the power transistor is coupled to the first voltage supply input.

10. The system of claim 9 including a gate driver coupled to a gate of the power transistor.

11. The system of claim 8 including a load coupled to receive current from the power transistor.

12. The system of claim 1:
   in which the disabling circuitry is for providing the disabling signal for a time period; and
   in which the disabling circuitry is for providing a re-enabling signal after the time period.

13. A circuit reliability system, comprising:
   a first voltage supply input receiving a first voltage;
   a second voltage supply having an input coupled to the first voltage supply input, a disable input, and a second voltage supply output providing a second voltage;
   a node coupled to the first voltage supply input and the second voltage supply output;
   a power transistor having a gate coupled to the node;
   monitoring circuitry having an input coupled to the node and an output providing a disable signal indicating the first voltage exceeding a threshold; and
   disabling circuitry having an input coupled to the monitoring circuitry output and having a disable output coupled to the disable input, the disabling circuitry providing a disable signal on the disable output to disable the second voltage supply in response to the monitoring circuitry indicating the first voltage exceeding a threshold.

14. The system of claim 13 including a gate driver coupled between the node and the gate of the power transistor.

15. The system of claim 13 in which the monitoring circuitry includes a series source/drain path of a plurality of series-connected Zener diodes.

16. The system of claim 13:
   a battery coupled to the first voltage supply input; and
   in which the second voltage supply includes a charge pump coupled to the first voltage supply input.

* * * * *